United States Patent [19]

Yoshimoto et al.

[11] 4,379,667
[45] Apr. 12, 1983

[54] CHUCK FOR MACHINE TOOLS

[75] Inventors: Hisanari Yoshimoto; Taka Tonomura; Takuo Takamura, all of Toyama, Japan

[73] Assignee: Kabushiki Kaisha Fujikoshi, Toyama, Japan

[21] Appl. No.: 199,813

[22] Filed: Oct. 23, 1980

[30] Foreign Application Priority Data

Nov. 8, 1979 [JP] Japan .................... 54-154183[U]

[51] Int. Cl.³ .................... B23C 1/00; B23B 31/04
[52] U.S. Cl. .................... 409/234; 279/1 N; 279/1 ME; 279/103; 408/239 R
[58] Field of Search ............ 409/234, 232; 408/239 R, 239 A; 279/1 N, 1 ME, 9 R, 103, 2 A, 1 B

[56] References Cited

U.S. PATENT DOCUMENTS

| | | | |
|---|---|---|---|
| 3,905,609 | 9/1975 | Sussman | 279/1 ME |
| 4,021,051 | 5/1977 | Toyomoto | 409/234 X |
| 4,251,084 | 2/1981 | Franklin | 279/1 ME |

FOREIGN PATENT DOCUMENTS

| | | | |
|---|---|---|---|
| 962845 | 4/1957 | Fed. Rep. of Germany ... | 279/1 ME |
| 2302210 | 7/1974 | Fed. Rep. of Germany ...... | 409/232 |
| 44-23894 | 10/1969 | Japan .................... | 279/1 N |

*Primary Examiner*—William R. Briggs
*Attorney, Agent, or Firm*—Spencer & Kaye

[57] ABSTRACT

A needle-roller type chuck for machine tools which includes a chuck body having a chuck barrel integral with the leading end portion of the chuck body. The chuck barrel has a leading end portion and an outer peripheral surface tapered to form a conical surface, and includes a plurality of holes extending from the leading end of the chuck barrel toward the chuck body. A rotatable clamping ring is positioned over the chuck barrel and has an inner conical surface extending in the axial direction of the chuck and parallel with the outer periperal surface of the chuck barrel. A needle-roller assembly having a plurality of needle rollers is positioned between the chuck barrel and the clamping ring in rotatable contact with the conical surface of the chuck barrel and the clamping ring.

9 Claims, 6 Drawing Figures

CHUCK FOR MACHINE TOOLS

BACKGROUND OF THE INVENTION

1. Field of the Invention

The present invention relates to an improvement in a chuck which is adapted to be attached to the spindle of a machine tool so as to grip a rotary cutting tool such as a drill or an end mill.

2. Description of the Prior Art

The conventional chuck using claws for gripping either a tool or an adaptor for holding a tool has such a localized gripping portion that its gripping force is insufficient to hold the tool and, still worse, its claws may damage the tool. In order to help alleviate these problems, there has been developed and widely used the so-called "needle-roller type chuck", as is disclosed in German Pat. No. 931,452, for example. In the chuck of this type, a cylindrical chuck barrel having an outer peripheral surface tapered into a conical surface is made integral with a chuck body. A clamp ring is rotatably fitted over the chuck barrel. The clamp ring has an inner conical surface extending in parallel with the outer peripheral surface of the chuck barrel. There are interposed between the chuck barrel and the clamp ring a multiplicity of needle rollers which are rotatably held in a retainer. These needle rollers are in contact with the outer peripheral surface of the chuck barrel and the inner peripheral surface of the clamp ring such that their axes are so inclined with respect to the axis of the chuck body as not to intersect therewith. Thus, when the clamp ring is rotationally fastened, the needle rollers spirally revolve along the conical surface while rotating about their own axes so that the chuck barrel may be pushed and contracted all over its surface thereby gripping the tool without damaging it or causing it to fall. If the clamp ring is rotationally loosened, on the other hand, the needle rollers are retracted in the direction toward the leading end of the chuck barrel so that the chuck barrel may be restored to allow the tool to be removed without difficulty.

However, since the conventional needle-roller type chuck thus far described has its gripping portion, i.e., its chuck barrel thinned to permit large deformation, its rigidity is so low as to result in undesirable chattering or rapid vibration at the waist of the chuck, especially, at the base portion of the chuck barrel when the cutting operation is performed on heavy duty material. In order to compensate for such insufficient rigidity, another needle-roller type chuck has been conceived which is thicker and which uses double rows of needle rollers, as is disclosed in U.S. Pat. No. 4,021,051 issued on May 3, 1977. However, since the construction is double in nature, ensuring the concentricity of the chuck is a problem, in addition, the construction is unavoidably complicated.

SUMMARY OF THE INVENTION

It is therefore an object of the present invention to provide a chuck for machine tools, which is so improved as to succeed in eliminating the drawbacks concomitant with the prior art.

Another but major object of the present invention is to provide a chuck which has its gripping force enhanced by means of deep holes although its chuck barrel is thick to increase the rigidity.

A further object of the present invention is to provide a chuck which is free from any chattering even if a heavy duty cutting operation is performed, which is free from losing its gripping force during operation, which has excellent rigidity and concentricity, which has a long lifetime and which can maintain a high gripping force with high accuracy.

The aforementioned objects of the present invention can be achieved by providing a needle-roller type chuck for machine tools, comprising: a chuck body adapted to be set in the chuck receiving port of a machine tool; a chuck barrel extending from and made integral with the leading end portion of said chuck body and having an outer peripheral surface tapered to form a conical surface; a clamp ring rotatably fitted over said chuck barrel and having an inner conical surface extending in parallel with the outer peripheral surface of said chuck barrel; a retainer interposed between said chuck barrel and said clamp ring; and a multiplicity of needle rollers held such that they are rotatable in contact with said chuck barrel and said clamp ring about their axes which are so inclined with respect to the axis of said chuck body as to be free from intersecting therewith, wherein the improvement resides in that said chuck barrel is formed with a plurality of deep holes which extend from the leading end toward said chuck body in such axial directions as are substantially in parallel with the axis of said chuck barrel and in that the lengths of said deep holes are made longer than the axial lengths of the contacting portions between said needle rollers and said chuck barrel.

In a preferred embodiment, the aforementioned deep holes may have an oval cross-section but are preferred to be drilled holes having a round cross-section with a view to facilitating their machining operations.

DESCRIPTION OF THE PREFERRED EMBODIMENTS

Figure 1:
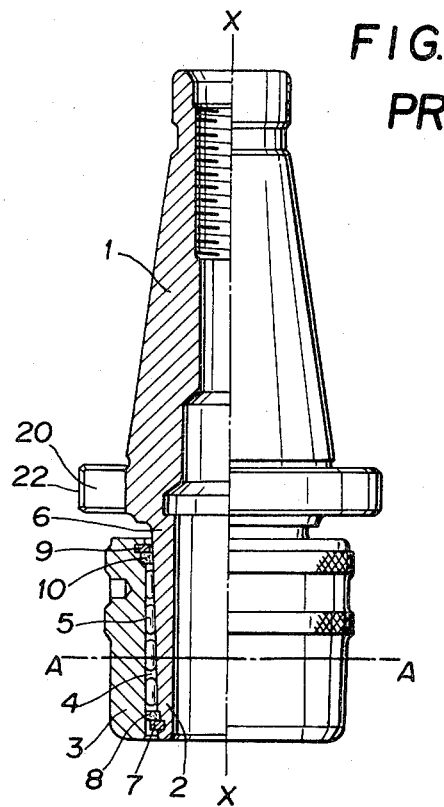
FIG. 1 is an axial sectional side elevation showing a chuck for machine tools according to the prior art.
Figure 2:
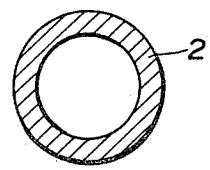
FIG. 2 is a cross-section of the chuck barrel of the prior art chuck of FIG. 1 taken along line A—A of FIG. 1.

FIGS. 1 and 2 show a chuck for machine tools, of the type disclosed in German Pat. No. 931,452. As shown, a cylindrical chuck barrel 2 having an outer peripheral surface tapered into a conical surface is made integral with the leading end portion of a chuck body 1 which is adapted to be set in the chuck receiving port of a machine tool. A clamp ring 3 is rotatably fitted over the chuck barrel 2. The clamp ring 3 has an inner conical surface extending in parallel with the outer peripheral surface of the chuck barrel 2. There are interposed between the chuck barrel 2 and the clamp ring 3 a multiplicity of needle rollers 5 which are rotatably held in a retainer 4. These needle rollers 5 are in contact with the outer peripheral surface of the chuck barrel 2 and the inner peripheral surface of the clamp ring 3 such that their axes are so inclined with respect to the axis X—X of the chuck body 1 as to not intersect therewith. Thus, when the clamp ring is rotationally fastened, the needle rollers spirally revolve along the conical surface while rotating about their own axes so that the chuck barrel may be pushed and contracted all over its surface thereby to grip the tool without damaging the tool or causing it to fail. If the clamp ring is rotationally loosened, on the other hand, the needle rollers are retracted in the direction toward the leading end of the chuck barrel so that the chuck barrel may be restored to allow the tool to be removed without difficulty. Indicated at reference numeral 20 are two key ways which are cut in the flange 22 of the chuck body 1 and in which the keys 18 of a spindle 16, as will be shown in FIG. 3, are to be fitted.

Figure 3:
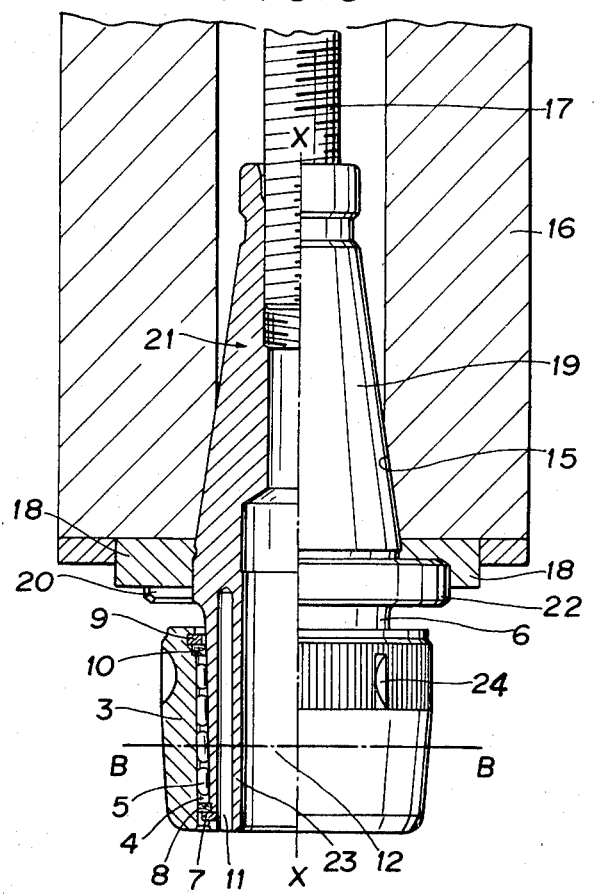
FIG. 3 is an axial sectional side elevation showing a chuck for machine tools according to a preferred embodiment of the present invention attached to the spindle of a machine tool.
Figure 4:
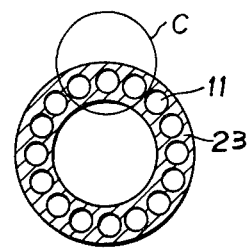
FIG. 4 is a cross-section of the chuck barrel of FIG. 3 taken along line B—B of FIG. 3.
Figure 5:
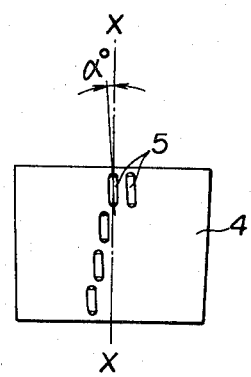
FIG. 5 shows the relationships between the retainer and the needle rollers of FIG. 3, showing only some of the needle rollers.

FIGS. 3 to 5 show a preferred embodiment of the present invention, in which parts equivalent to those appearing in FIGS. 1 and 2 are indicated by like reference numerals. Numeral 16 indicates the spindle of a machine tool such as a milling machine. Numeral 15 indicates the chuck receiving port which is formed at the free end of the spindle 16. A chuck body 21 has its holder 19 fitted in the chuck receiving port 15, and the keys 18 made integral with the spindle 16 are fitted in the key ways 20 of the flange 22 which is made integral with the chuck body 21. Moreover, the chuck body 21 is fixed to the spindle 16 by means of a clamp bolt 17 so that the driving force of the spindle 16 is transmitted to the chuck body 21 through the keys 18. The attachment of a tool is performed by inserting the tool (not shown) into a cavity 12 formed in the chuck barrel 2 and then by applying a fastening tool such as a spanner or a wrench to clamping notches 24 and rotating the same clockwise or counterclockwise thereby to fasten the clamp ring 3. The removal of the machining tool is performed by rotating in the reverse direction and loosening the clamp ring 3.

The chuck body 21 has its leading end portion integrally formed into the cylindrical chuck barrel 23 which has its outer peripheral surface tapered into a conical surface. The multiple needle rollers 5 are retained in the retainer 4 and are in contact with the outer peripheral surface of the chuck barrel 23. On the peripheral surfaces of the needle rollers 5, there is fitted the clamp ring 3 which has its inner peripheral surface tapered to form a conical surface which is parallel with the outer peripheral surface of the chuck barrel 23. A snap ring 7 is fitted in the peripheral groove which is formed in the vicinity of the lowermost end of the outer peripheral surface of the chuck barrel 23. A felt ring 8 is retained between the snap ring 7 and the lower end of the retainer 4 thereby to prevent the retainer 4 from coming out. On the other hand, the other snap ring 9 is fitted in the peripheral groove which is formed in the inner peripheral surface in the vicinity of the uppermost end of the clamp ring 3. The other felt ring 10 is also retained between the snap ring 9 and the upper end of the retainer 4 thereby to prevent the clamp ring 3 from coming out. The construction thus far described is well known in the art so that its detailed description will be omitted here.

According to the present invention, the chuck barrel 23 is thick and is formed with a number of deep holes 11 which extend in parallel in the thick chuck barrel 23 until they reach the waist 6 located thereabove by way of the portions of the chuck barrel 23 contacting with the needle rollers 5. The chuck barrel 23 is made of a material substantially similar to that of the conventional chuck barrel 2, e.g., case hardening steel.

Figure 6:
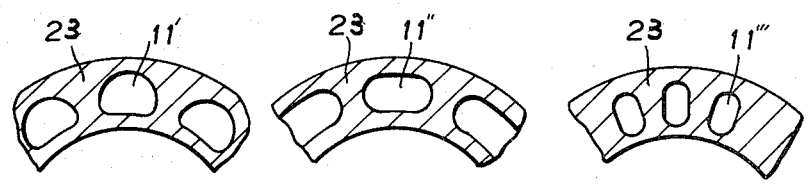
FIG. 6 is an enlarged view of portion C of FIG. 4 showing the deep holes according to alternative embodiments of the invention.

As better seen from FIG. 5, each of the needle rollers 5 is retained in the retainer 4 such that its axis is so inclined at a predetermined angle of $\alpha$ degrees with respect to the axis X—X of the chuck body 21 as to not intersect with axis X—X. The cross-sectional shape of the deep holes 11 may be selected from the various shapes, e.g., a crescent shape 11′, a circumferential cocoon shape 11″ or a radial cocoon shape 11‴, as shown in FIG. 6, but is preferred to be drilled to have a round shape so as to facilitate the machining operations.

Reverting to FIG. 3, if the clamp ring 3 is rotated clockwise, as viewed from below, the respective needle rollers 5 spirally revolve along the outer peripheral surface of the chuck barrel 2, while rotating in the directions at a right angle with respect to their own axes, and rise together with the clamp ring 3 because they are in contact with the chuck barrel 2 and the clamp ring 3 so that the chuck barrel 2 is strongly pushed and forcibly contracted from its outer peripheral surface thereby to grip the tool (not shown) which is set in the cavity 12 of the chuck barrel 2.

Generally speaking, since the limit in the contraction of the chuck barrel is due to the deformation within the elastic limit of metal, the conventional thin chuck barrel can have a large amount of deformation and a strong gripping force but has the drawback that its waist is weak and will not resist the folding and twisting forces placed on it. According to the present invention, since the chuck barrel is thick and formed with a multiplicity of deep holes extending in parallel, the gripping force can be enhanced by the actions of the deep holes notwithstanding the increases in the thickness and rigidity. As a result, it is possible to provide a chuck which is free from chattering even if a heavy duty cutting operation is performed, which suffers from little deformation due to fatigue, which has excellent rigidity, concentricity and lifetime, and which can maintain a high gripping force with high accuracy. According to the present invention, moreover, since the needle rollers are inclined at the predetermined angle of $\alpha$ degrees with respect to the axis X—X they suitably push the thinned portions of the outer peripheral surface of the chuck barrel toward the deep holes 11 when they are fastened, which assures that the tool being gripped will not work its way loose.

What is claimed is:

1. A needle-roller type chuck for machine tools comprising:

a chuck body having a longitudinal axis and a leading end portion;

a chuck barrel integral with the leading end portion of said chuck body and extending axially therefrom, said chuck barrel having a leading end portion, an outer peripheral conically tapered surface and a plurality of holes circumferentially distributed about said axis and extending from the leading end of said chuck barrel toward said chuck body;

a rotatable clamping ring positioned over said chuck barrel, said clamping ring having an inner conical surface extending in the axial direction of said chuck body and parallel with the outer peripheral surface of said chuck barrel;

a needle roller assembly having a predetermined axial length, said assembly comprising a plurality of needle rollers positioned between said chuck barrel and said clamping ring in rotatable contact with the conically tapered surface of said chuck barrel and conical surface of said clamping ring; and the axial length of each of the plurality of holes corresponding substantially to the predetermined axial length of the needle roller assembly.

2. A needle-roller type chuck according to claim 1, wherein the cross-section of said deep holes is formed into an oval shape.

3. A needle-roller type chuck according to claim 1, wherein the cross-section of said deep holes is formed into a round shape.

4. A needle-roller type chuck according to claim 1, wherein the cross-section of said deep holes is formed into a crescent shape.

5. A needle-roller type chuck according to claim 1, wherein the cross-section of said deep holes is formed into a cocoon shape.

6. A needle-roller type chuck according to claim 5, wherein the cocoon-shaped cross-section has its longer axis arranged in the radial direction of said chuck barrel.

7. A needle-roller type chuck according to claim 5, wherein the cocoon-shaped cross-section has its longer axis arranged generally in the peripheral direction of said chuck barrel.

8. The needle-roller type chuck of claim 1, wherein said plurality of needle rollers are rotatable about a common axis of rotation inclined with respect to the longitudinal axis of said chuck body.

9. The needle-roller type chuck of claim 8, wherein the axial length of each of the plurality of holes in said chuck barrel is greater than the predetermined axial length of said needle-roller assembly.

* * * * *